US009587151B2

(12) United States Patent
Messana et al.

(10) Patent No.: US 9,587,151 B2
(45) Date of Patent: Mar. 7, 2017

(54) ANAEROBIC CURABLE COMPOSITIONS

(71) Applicant: Henkel IP & Holding GmbH, Duesseldorf (DE)

(72) Inventors: Andrew D. Messana, Newington, CT (US); David P. Dworak, Middletown, CT (US); Angelica Messana, Newington, CT (US); Anthony F. Jacobine, North Haverhill, NH (US); Darel Gustafson, Shelton, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/605,037

(22) Filed: Jan. 26, 2015

(65) Prior Publication Data
US 2015/0136323 A1  May 21, 2015

Related U.S. Application Data

(63) Continuation-in-part of application No. 13/839,785, filed on Mar. 15, 2013, now Pat. No. 8,945,338.

(51) Int. Cl.
| | |
|---|---|
| C09J 175/14 | (2006.01) |
| C09J 4/00 | (2006.01) |
| C09J 171/08 | (2006.01) |
| C09J 11/06 | (2006.01) |
| C08G 18/36 | (2006.01) |

(Continued)

(52) U.S. Cl.
CPC ............ *C09J 171/08* (2013.01); *C08G 18/36* (2013.01); *C08G 18/672* (2013.01); *C08G 18/755* (2013.01); *C09J 4/00* (2013.01); *C09J 5/00* (2013.01); *C09J 11/06* (2013.01); *C09J 175/16* (2013.01); *C08F 2222/1013* (2013.01); *C08G 2170/80* (2013.01); *C09J 2400/163* (2013.01); *C09J 2433/00* (2013.01); *C09J 2475/00* (2013.01); *Y10T 156/10* (2015.01)

(58) Field of Classification Search
None
See application file for complete search history.

(56) References Cited

U.S. PATENT DOCUMENTS 4,180,598 A * 12/1979 Emmons ................. C09D 4/00
427/496
6,232,431 B1   5/2001 Hosoki
(Continued)

FOREIGN PATENT DOCUMENTS

| RU | 2374290 | 11/2009 |
|---|---|---|
| WO | 2010135792 A1 | 2/2010 |

(Continued)

OTHER PUBLICATIONS

Dzunuzovic et al. (Progress in Organic Coatings 52, 2005, 136-143).*

(Continued)

*Primary Examiner* — Vu A Nguyen
(74) *Attorney, Agent, or Firm* — Steven C. Bauman

(57) ABSTRACT

The invention provides anaerobic curable compositions comprising a (meth)acrylate component, at least a portion which comprises a (meth)acrylate-functionalized bio-renewable oleaginous polyurethane polymer, and methods of their production and use. These compositions provide excellent adhesion especially on oily surfaces.

18 Claims, 3 Drawing Sheets

(51) Int. Cl.
    *C08G 18/67*     (2006.01)
    *C08G 18/75*     (2006.01)
    *C09J 5/00*     (2006.01)
    *C09J 175/16*     (2006.01)
    *C08F 222/10*     (2006.01)

(56) References Cited

U.S. PATENT DOCUMENTS

| | | |
|---|---|---|
| 7,678,936 B2 | 3/2010 | Jones et al. |
| 8,048,979 B2 | 11/2011 | Syamakumari et al. |
| 8,598,247 B2 | 12/2013 | Vairo |
| 2008/0302694 A1* | 12/2008 | Gardner ............. C08G 18/6725 206/524.3 |

FOREIGN PATENT DOCUMENTS

| | | |
|---|---|---|
| WO | 2013091211 | 6/2013 |
| WO | 2014151358 | 9/2014 |

OTHER PUBLICATIONS

Patel et al. (Archives of Applied Science Research, 2009, 1 (2), 294-305).*
R.D. Rich, "Anaerobic Adhesives" in Handbook of Adhesive Technology, 29, 467-79, A. Pizzi and K.L. Mittal, eds., Marcel Dekker, Inc., New York (1994).
Rida Tajau, Mohammad Ibrahim, Development of palm oil-based UV-curable epoxy acrylate and urethane acrylate resins for wood coating application, AIP Conference Proceedings, 1584, 164 (2014).
International Search Report issued in connection with International Patent Application No. PCT/US2016/014702 mailed May 19, 2016.

* cited by examiner

ANAEROBIC CURABLE COMPOSITIONS

BACKGROUND

Field

The invention provides anaerobic curable compositions comprising a (meth)acrylate component, at least a portion which comprises a (meth)acrylate-functionalized bio-renewable oleaginous polyurethane polymer, and methods of their production and use. These compositions provide excellent adhesion especially on oily surfaces.

Brief Description of Related Technology

Anaerobic adhesive compositions generally are well-known. See e.g., R. D. Rich, "Anaerobic Adhesives" in *Handbook of Adhesive Technology,* 29, 467-79, A. Pizzi and K. L. Mittal, eds., Marcel Dekker, Inc., New York (1994), and references cited therein. Their uses are legion and new applications continue to be developed.

Anaerobic thread locker products have been used extensively to lock various bolts and nuts to prevent them from becoming loose during use. In general, anaerobic thread locker products offer good curing speed and produce required torque strength after cure on ferrous metal surfaces. However, when the bolts and nuts are made from steel and remain covered with oil left over from their manufacture, the curing speed of a medium strength anaerobic adhesive, for instance, may be compromised and the torque strength of the cured anaerobic adhesive may not be optimal. It would be a significant commercial advantage if the cure speed and torque strength could be improved, particularly when the substrates to be bonded have oily surfaces.

SUMMARY

That advantage is provided here through the use of derivatized renewable materials, such as (meth)acrylate-functionalized bio-renewable oleaginous polyurethane polymers.

In one aspect, the invention provides an anaerobically curable composition, which includes:
(a) at least one (meth)acrylate component;
(b) an anaerobic cure system; and
(c) a (meth)acrylate-functionalized bio-renewable oleaginous polyurethane polymer.

The invention provides in another aspect a method for using an anaerobically curable composition. Here, the method includes:
providing an anaerobically curable composition comprising at least one (meth)acrylate component, an anaerobic cure system, and a (meth)acrylate-functionalized bio-renewable oleaginous polyurethane polymer;
providing two or more substrates, each of which having at least one complimentary surface;
applying the anaerobically curable composition to at least one of the complimentary surfaces of the substrates; and
mating the complimentary surfaces of the substrates such that the anaerobically curable composition is disposed therebetween such that an anaerobic environment is present so as to permit the anaerobically curable composition.

In another aspect, this invention provides a method of bonding an oily surface comprising the steps of:
(a) providing an adhesive composition comprising;
  (i) at least one (meth)acrylate component;
  (ii) a cure system; and
  (iii) a (meth)acrylate-functionalized bio-renewable oleaginous polyurethane polymer;
(b) applying composition to an oily surface of a substrate;
(c) mating the substrate with another substrate; and
(d) permitting the composition to cure.

DETAILED DESCRIPTION

Figure 1:
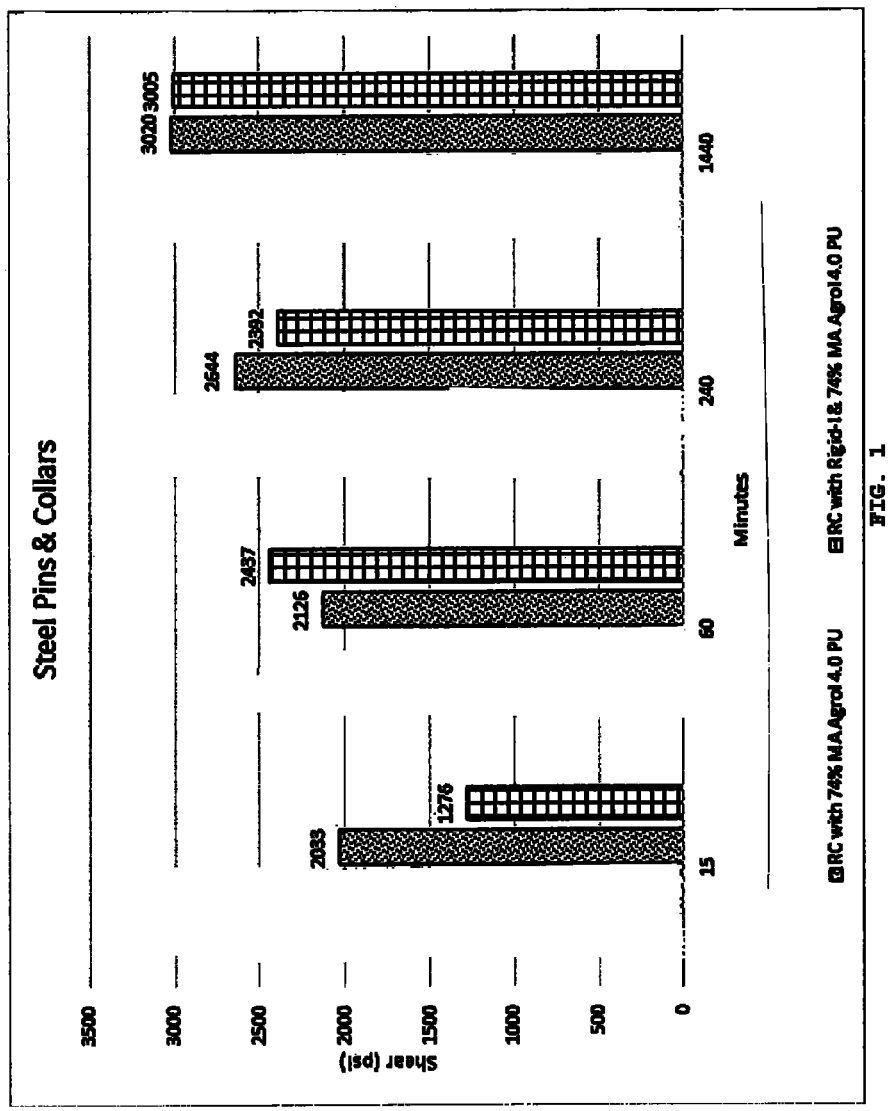
FIG. 1 depicts a plot of shear strength measured in psi over time measured in minutes for anaerobically curable compositions some of which having (meth)acrylate-functionalized Agrol-branded bio-renewable component.

As noted above, the invention provides in one aspect an anaerobically curable composition, which includes:
(a) at least one (meth)acrylate component;
(b) a cure system; and
(c) a (meth)acrylate-functionalized bio-renewable oleaginous polyurethane polymer.

The invention provides in another aspect a method for using an anaerobically curable composition. Here, the method includes:
providing an anaerobically curable composition comprising
(a) at least one (meth)acrylate component;
(b) a cure system; and
(c) a (meth)acrylate-functionalized bio-renewable oleaginous polyurethane polymer;
providing two or more substrates, each of which having at least one complimentary surface;
applying the anaerobically curable composition to at least one of the complimentary surfaces of the substrates; and
mating the complimentary surfaces of the substrates such that the anaerobically curable composition is disposed therebetween such an anaerobic environment is present so as to permit the anaerobically curable composition.

(Meth)acrylate monomers suitable for use as the (meth)acrylate component may be chosen from a wide variety of materials, such as those represented by $H_2C=C(G)CO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Other (meth)acrylate monomers may also be used, such as reaction products of the diglycidylether of bisphenol-A with methacrylic acid and a (meth)acrylate ester corresponding to structure as shown below:

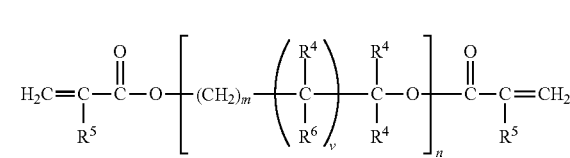

where $R^4$ may be selected from hydrogen, alkyl groups having from 1 to about 4 carbon atoms, hydroxyalkyl groups having from 1 to about 4 carbon atoms or

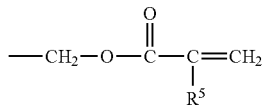

$R^5$ may be selected from hydrogen, halogen, and alkyl groups of from 1 to about 4 carbon atoms;

$R^6$ may be selected from hydrogen, hydroxy and

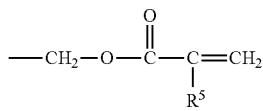

m is an integer equal to at least 1, e.g., from 1 to about 8 or higher, for instance, from 1 to about 4;

v is 0 or 1; and n is an integer equal to at least 1, e.g., 1 to about 20 or more.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein in its entirety by reference.

Of course, combinations of these (meth)acrylate monomers may also be used.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Of course, combinations of these (meth)acrylate monomers may also be used.

The (meth) acrylate component comprises generally from about 10 to about 90 percent by weight of the total composition, preferably about 50 to about 90 percent by weight, and typically about 55 percent by weight percent to about 85 percent by weight percent, based on the total weight of the composition.

The anaerobic cure system includes at least one cure initiator and at least one cure accelerator.

Examples of suitable cure initiators are tetramethylbutyl hydroperoxide, tert-amylhydroperoxide, tetrahydroquinoline and alkylated tetrahydroquinoline, such as methyl tetrahydroquinoline.

Examples of suitable cure accelerators are those listed, for example, in U.S. Pat. No. 6,835,762 (Klemarczyk), U.S. Pat. No. 6,897,277 (Klemarczyk) and U.S. Pat. No. 6,958,368 (Klemarczyk).

More specifically, the components of the anaerobic cure system comprise cumene hydroperoxide, tetramethylbutyl hydroperoxide and/or tert-amylhydroperoxide, tetrahydroquinoline and/or alkylated tetrahydroquinoline, each in an amount effective to trigger anaerobic cure when exposed to conditions substantially devoid of oxygen. Anaerobic cure for a period of time of 24 hours at room temperature ordinarily achieves at least about 80 percent of the ultimate strength of the cured composition.

The effective amount of the components of the anaerobic cure system should be in the range of 0.1 to 5.0 percent by weight of the total composition. Each of the cure initiator and cure accelerator may be present in amounts of 0.1 percent to about <5 percent by weight (e.g., about 0.1 percent by weight to about 3 percent by weight) of the total composition but their total weight together does not exceed 0.1 percent by weight to about 5 percent by weight of the total composition.

The invention provides a method for preparing an anaerobically curable composition. In this aspect, the method includes:

(a) at least one (meth)acrylate component;

(b) an anaerobic cure system; and (c) a (meth)acrylate-functionalized bio-renewable oleaginous polyurethane polymer.

The invention provides in another aspect a method for using an anaerobically curable composition. Here, the method includes:

providing an anaerobically curable composition comprising (a) at least one (meth)acrylate component;

(b) an anaerobic cure system; and (c) a (meth)acrylate-functionalized bio-renewable oleaginous polyurethane polymer;

providing two or more substrates, each of which having at least one complimentary surface;

applying the anaerobically curable composition to at least one of the complimentary surfaces of the substrates; and mating the complimentary surfaces of the substrates such that the anaerobically curable composition is disposed therebetween such an anaerobic environment is present so as to permit the anaerobically curable composition.

The invention provides in another aspect an anaerobically curable composition. The composition includes:

(a) at least one (meth)acrylate component;

(b) an anaerobic cure system; and (c) a (meth)acrylate-functionalized bio-renewable oleaginous polyurethane polymer.

The (meth)acrylate-functionalized bio-renewable oleaginous polyurethane polymer is prepared from a bio-renewable oleaginous plasticizer, which may be typically an oil component. Examples of suitable oil components are soybean oil or an alkyl ester of soybean oil, canola oil or an alkyl ester of canola oil (such as, for example, alkyl esters where the alkyl group has from 1 to about 4 carbon atoms). Examples of a methyl ester of soybean oil are SoyGold 1000, SoyGold 1100, CanolaGold 1000, and SoyClear 1500. All of these products are available commercially from Ag Environmental Products LLC, Omaha, Nebr. The advantages of these products include properties such as bio-based origin, biodegradability, non-toxicity and low VOC. These products are known for their use as solvents and biodiesel.

Other examples of bio-renewable oleaginous plasticizers for use herein include Pomoflex 6156 and Pomoflex 4156, available commercially from Piedmont Chemical Industries I, LLC, High Point, N.C. The manufacturer describes Pomoflex 6156 as a polyester polyol having a molecular weight of about 2,000, a functionality of 2.0 and a hydroxyl number of 56. The material is reportedly made from biorenewable feed stocks. The manufacturer describes Pomoflex 4156 as a non-polar polyester polyol having a molecular weight of about 2,000 and a hydroxyl number of 52-58. The material is reportedly made from 82% renewable, non-petroleum based raw materials.

Still other examples of bio-renewable oleaginous plasticizers for use herein include the products sold under the Agrol trademark by BioBased technologies, Springdale, Ariz. Some of those products are Agrol 2.0-5.6 (described as soy-based polyols or hydroxylated soybean oil containing 97% or more bio-based content derived from purified soybean oil). The hydroxyl values (mg KOH/g) vary from 65-74 (for Agrol 2.0), 107-117 (for Agrol 3.6), 125-137 (for Agrol 4.3) and 151-170 (for Agrol 5.6).

And still other examples include Oxi-Cure 2000 from Cargill, Incorporated, Minneapolis, Minn., which is comprised of vegetable-based esters that are highly reactive and have relatively low viscosity, and Myrifilm from Myrian Corporation, Quincy, Mass., which is a bio-based, ultra low odor, broad spectrum coalescing solvent.

The (meth)acrylate-functionalized bio-renewable oleaginous polyurethane polymer is prepared by using either a direct method or an extended method.

In the direct method, the bio-renewable oleaginous plasticizer is a hydroxylated material derived from plant oil, which is directly reacted with a (meth)acrylate component containing a free NCO group. A curable (meth)acrylate-functionalized polyurethane polymer is so formed.

Desirably the equivalents ratio of OH:NCO in the reactants is about 0.1 to 3.0, such as about 0.4 to about 2.0, and desirably about 0.8 to about 1.0 equivalents of OH:NCO.

The reaction is run in a reactor with or without solvent. When a solvent is used, suitable ones include polar, aprotic ones like toluene, THF, ethyl acetate, xylenes, and the like. The reaction is run at temperatures of about 25° C. to about 100° C., such as about 40° C. to about 80° C., desirably about 60° C. to about 75° C.

Metal-based catalysts, such as dibutyltin dilaurate among others, may be used in amounts of about 0.01% to about 5 wt %, such as about 0.5% to about 2 wt %, desirably about 0.1% to about 1.0 wt %, based on the total reaction mixture. The reaction should be carried out for as long as required to substantially fully react the isocyanate and hydroxyl groups. Reaction times may range from about 2 to about 24 hours, such as about 3 to about 12 hours, desirably about 4 to about 8 hours. The resultant curable (meth)acrylate-functionalized polyurethane polymer has incorporated therein at least a portion, and desirably substantially all, of the oleaginous component.

In the extended method, the bio-renewable oleaginous plasticizer is a hydroxylated material derived from plant oil, which is reacted with a diisocyanate to form a polyurethane intermediate. The stoichiometry of the reactants is controlled such that the polyurethane intermediate contains unreacted, pendent NCO groups, intended to be used for further reaction. That is, pendent NCO groups remain on the polyurethane intermediate for further reaction with, for example, a hydroxyl containing (meth)acrylate component, a polyfunctional alcohol component, or an alkoxy-containing amine component.

The equivalents ratio of OH to NCO in the starting reactants (hydroxylated oleaginous and diisocyante components) is about 0.1 to about 10.0, such as about 0.2 to about 3.0, desirably about 0.5 to about 2.0 equivalents of OH to NCO.

The reaction is run in a reactor with or without solvent. When a solvent is used, suitable ones include polar, aprotic ones like toluene, THF, ethyl acetate, xylenes, and the like. The reaction is run at temperatures of about 25° C. to about 100° C., such as about 40° C. to about 80° C., desirably about 60° C. to about 75° C.

Metal-based catalysts, such as dibutyltin dilaurate (among others) may be used in amounts of about 0.01 wt % to about 5 wt %, such as about 0.5 wt % to about 2 wt %, desirably about 0.1 wt % to about 1.0 wt %, based on the total reaction mixture. The reaction should be carried out for as long as required to substantially fully react the isocyanate and hydroxyl groups. Reaction times may range from about 2 to about 24 hours, such as about 3 to about 12 hours, desirably about 4 to about 8 hours. The resultant curable (meth)acrylate-functionalized polyurethane polymer has incorporated therein at least a portion, and desirably substantially all, of the oleaginous component.

Here, the formed intermediate polyurethane contains pendent NCO groups which are available for reaction with additional components.

For example, the intermediate polyurethane may be further reacted, if desired, with one or more component(s) containing hydroxyl groups, alkoxy groups or amine groups. For example, the intermediate polyurethane polymer may be reacted with an aminosilane compound which includes alkoxy functionality for moisture curing. One particularly desirable further reaction includes the reaction of the intermediate polyurethane with an hydroxyl-containing (meth)acrylate component [e.g., 2-hydroxyethyl(meth)acrylate ("HEMA")], to yield curable (meth)acrylate-functionalized polyurethane polymers. Desirably the equivalents ratio of NCO:OH in the reaction of the intermediate polyurethane with the hydroxyl-containing (meth)acrylate component is about 1:0.01 to about 1:1.2. This reaction yields a curable (meth)acrylate-functionalized polyurethane polymer useful for a variety of applications as previously mentioned. The reaction of the intermediate polyurethane with the hydroxyl-containing (meth)acrylate component is carried out for as long as required to fully react the isocyanate and hydroxyl groups. Typically, the reaction time may range from about 2 to about 12 hours, such as about 3 to about 12 hours, desirably 4 to 8 hours.

The amount of renewable content present in the intermediate and final polymers made in accordance with the present invention may range from about 30 wt % to about 70 wt %, more desirably about 45 wt % to about 60 wt %. Due to the selection of the specific hydroxylated oleaginous material, the end products formed may contain a hard (relatively rigid) segment (attributed to the reaction of the diisocyante with short chain diols present in the hydroxylated oleaginous materials) of about 1 wt % to about 10 wt % and desirably about 2 wt % to about 5 wt %.

The (meth)acrylate-functionalized bio-renewable oleaginous polyurethane polymer may be present in an amount of about 1 wt % to about 60 wt %, such as about 1 wt % to about 35 wt %, desirably about 2 wt % to about 35 wt %, of the total composition.

Thus, in another aspect, the invention discloses an anaerobically curable composition comprising:

a (meth)acrylate component in the amount of about 50 wt % to about 90 wt % of the total composition;

an anaerobic cure system in the amount of about 0.1 wt % to about 5.0 wt % of the total composition; and a (meth)acrylate-functionalized bio-renewable oleaginous polyurethane polymer, such as a (meth)acrylate-functionalized soybean oil component, in an amount of about 1.0 wt % to about 40.0 wt % of the total composition.

In another aspect, this invention discloses a method of preparing an adhesive composition said method comprising:
(a) forming a composition comprising:
 (i) at least one (meth)acrylate component in the amount of about 50 wt % to about 90 wt % of the total composition; and
 (ii) an anaerobic cure system in the amount of about 0.1 wt % to about 5.0 wt % of the total composition; and
(b) combining said composition with a (meth)acrylate-functionalized bio-renewable oleaginous polyurethane polymer, such as a (meth)acrylate-functionalized soybean oil component, in an amount of 1.0 wt % to about 40.0 wt %.

In yet another aspect, this invention discloses a method of bonding an oily surface comprising the steps of:
(a) providing an anaerobic adhesive composition comprising;
 (i) at least one (meth)acrylate component in the amount of about 50 wt % to about 90 wt % of the total composition;
 (ii) an anaerobic cure system in the amount of about 0.1 wt % to about 5.0 wt % of the total composition; and
 (iii) a (meth)acrylate-functionalized bio-renewable oleaginous polyurethane polymer, such as a (meth)acrylate-functionalized soybean oil component, in an amount of about 1.0 wt % to about 40.0 wt % of the total composition;
(b) applying the composition to an oily surface of a substrate;
(c) mating the substrate with another substrate; and
(d) permitting the composition to cure.

In yet another aspect, additional components that have been included in traditional anaerobic curable compositions to alter the physical properties of either the curable compositions or the reaction products thereof may be included in the present compositions and methods also.

For instance, one or more of maleimide components, thermal resistance-conferring coreactants, diluent components (diluents) reactive at elevated temperature conditions, mono- or poly-hydroxyalkanes, polymeric plasticizers, coloring agents, thickeners and chelators (see International Patent Application No. PCT/US98/13704; U.S. Pat. No. 6,391,993, the disclosure of which is hereby expressly incorporated herein in its entirety by reference) may be included to modify the physical property and/or cure profile of the formulation and/or the strength or temperature resistance of the cured adhesive.

When used, the maleimide, coreactant, reactive diluent, plasticizer, mono- or poly-hydroxyalkanes, coloring agents, thickeners and/or chelators may be present in an amount generally in the range of about 0.001 wt % to about 30 wt %, desirably in the range of 0.001 wt % to about 10 wt % and typically in the range of 0.005 wt % to about 5 wt %, based on the total composition.

The inventive compositions may also include other conventional components, such as free radical initiators, free radical accelerators, inhibitors of free radical generation, as well as metal catalysts, such as iron and copper.

A number of well-known initiators of free radical polymerization are typically incorporated into anaerobic curable compositions including hydroperoxides, such as CHP, paramenthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy) valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

EXAMPLES

Example 1

This example shows samples (five) in which an oleaginous plasticizer was used to formulate anaerobic adhesive compositions compared to samples (two) in which no such plasticizer was used. Table 1 shows the constituents of the formulations:

TABLE 1

| Sample No. | Component | Amount | Note |
|---|---|---|---|
| 1 | Polyethyleneglycol Dimethacrylate | 38.76 | No bio-renewable oleaginous plasticizer for comparison |
|  | Ethoxylated Bisphenol A Dimethacrylate | 40.00 |  |
|  | Stabilizers | 0.70 |  |
|  | polymeric plasticizer, (hexanedioic acid, polymer with 1,4-butanediol, 1,3-propanediol, 2,2-dimethyl and isononanol) | 15.00 |  |
|  | anaerobic cure-inducing composition | 2.94 |  |
|  | polyethylene powder | 2.50 |  |
|  | blue dye | 0.07 |  |
|  | fluorescent dye | 0.03 |  |
| 2 | Polyethyleneglycol Dimethacrylate | 38.76 | SoyGold 1000 |
|  | Ethoxylated Bisphenol A Dimethacrylate | 40.00 |  |
|  | Stabilizers | 0.70 |  |
|  | SoyGold 1000 | 15.00 |  |
|  | anaerobic cure-inducing composition | 2.94 |  |
|  | polyethylene powder | 2.50 |  |
|  | blue dye | 0.07 |  |
|  | fluorescent dye | 0.03 |  |
| 3 | Polyethyleneglycol Dimethacrylate | 95.45 | No bio-renewable oleaginous plasticizer for comparison |
|  | Stabilizers | 1.37 |  |
|  | anaerobic cure-inducing composition | 3.08 |  |
|  | blue dye | 0.07 |  |
|  | fluorescent dye | 0.03 |  |
| 4 | Polyethyleneglycol Dimethacrylate | 74.30 | SoyGold 1000 |
|  | Stabilizers | 1.37 |  |
|  | Soygold 1000 | 21.15 |  |
|  | anaerobic cure-inducing composition | 3.08 |  |
|  | blue dye | 0.07 |  |
|  | fluorescent dye | 0.03 |  |
| 5 | Polyethyleneglycol Dimethacrylate | 74.30 | SoyGold 1100 |
|  | Stabilizers | 1.37 |  |
|  | Soygold 1100 | 21.15 |  |
|  | anaerobic cure-inducing composition | 3.08 |  |
|  | blue dye | 0.07 |  |
|  | fluorescent dye | 0.03 |  |
| 6 | Polyethyleneglycol Dimethacrylate | 74.30 | SoyClear 1500 |
|  | Stabilizers | 1.37 |  |
|  | SoyClear 1500 | 21.15 |  |
|  | anaerobic cure-inducing composition | 3.08 |  |
|  | blue dye | 0.07 |  |
|  | fluorescent dye | 0.03 |  |
| 7 | Polyethyleneglycol Dimethacrylate | 74.30 | CanolaGold 110 |
|  | Stabilizers | 1.37 |  |
|  | CE110 | 21.15 |  |
|  | anaerobic cure-inducing composition | 3.08 |  |
|  | blue dye | 0.07 |  |
|  | fluorescent dye | 0.03 |  |

Example 2

Oily steel bolt and nuts were assembled as follows:
1. The steel bolts and nuts were degreased by aqueous cleaner, water rinsed, and dried at elevated temperature.
2. The degreased steel bolts and nuts were immersed in 15 percent of oil in water for 30 seconds.
3. The re-oiled bolts and nuts were placed in an 80° C. oven for 30 min to dry.
4. The bolts and nuts were left at room temperature to cool down.

The oily steel bolts and nuts were assembled together with prepared anaerobic thread locker Loctite 242 (available commercially from Henkel Corporation, Rocky Hill, Conn.). Loctite 242 is a medium strength anaerobic thread locker which does not have good curing speed on stainless steel or oily steel surface and the breakaway or breakloose torque strengths of cured Loctite 242 on these surfaces are also low. Thus, this was used for reference. The assembled bolts and nuts were left at room temperature to cure for 1 hour and 24 hours, respectively. Breakaway or breakloose torque strengths were measured on the cured bolts and nuts at the end of 1 hour and 24 hours.

The thread locker product, Loctite 242, was reformulated using SoyGold 1000, SoyGold 1100, CanolaGold 110, or SoyClear 1500 as a plasticizer component. The oily steel bolts and nuts were assembled together with the thus-reformulated Loctite 242. The assembled bolts and nuts were left at room temperature to cure for 1 hour and 24 hours, respectively. Breakaway or breakloose torque strengths were measured on the cured bolts and nuts at the end of 1 hour and 24 hours.

The performances of these products were compared based on the breakaway or breakloose torque test results which are shown in Tables 2 and 3.

TABLE 2

| | Degreased steel bolts and nuts | | LAB OIL 72-D on steel bolts and nuts | | ELF EVOLUTION SXR (5W-30) oil on steel bolts and nuts | | |
|---|---|---|---|---|---|---|---|
| | Breakloose | Average Prevail | Breakloose | Average Prevail | Breakloose | Average Prevail | Note |
| 1 hr Breakloose (in-lbs) | | | | | | | |
| Loctite 242 | 98 | 18 | | | 58 | 3 | |
| Loctite 2400NA | 85 | 5 | 39 | 4 | 59 | 6 | |
| 1 | 134 | 45 | 68 | 9 | 48 | 33 | No bio-renewable oleaginous plasticizer for comparison |
| 2 | 116 | 58 | 86 | 10 | 87 | 14 | SoyGold 1000 |
| 24 hr Breakloose (in-lbs) | | | | | | | |
| Loctite 242 | 148 | 38 | | | 88 | 23 | |
| Loctite 2400NA | 156 | 27 | 80 | 3 | 88 | 17 | |
| 1 | 173 | 85 | 72 | 36 | 63 | 38 | No bio-renewable oleaginous plasticizer for comparison |
| 2 | 178 | 58 | 116 | 15 | 134 | 42 | SoyGold 1000 |

TABLE 3

| | Degreased steel bolts and nuts | | Aquasafe 21 OIL on steel bolts and nuts | | |
|---|---|---|---|---|---|
| | Breakloose | Average Prevail | Breakloose | Average Prevail | Note |
| 1 hr Breakloose (in-lbs) | | | | | |
| Loctite 242 | 98 | 18 | 64 | 4 | |
| 3 | 116 | 261 | 58 | 48 | No bio-renewable oleaginous plasticizer for comparison |
| 4 | 157 | 67 | 89 | 36 | SoyGold 1000 |
| 5 | 134 | 70 | 94 | 44 | SoyGold 1100 |
| 6 | 142 | 55 | 93 | 32 | SoyClear 1500 |
| 7 | 150 | 67 | 88 | 35 | CanolaGold 110 |
| 24 hr Breakloose (in-lbs) | | | | | |
| Loctite 242 | 148 | 38 | 94 | 21 | |
| 3 | 107 | 243 | 59 | 62 | No bio-renewable oleaginous |

TABLE 3-continued

| | Degreased steel bolts and nuts | | Aquasafe 21 OIL on steel bolts and nuts | | |
|---|---|---|---|---|---|
| | Break-loose | Average Prevail | Break-loose | Average Prevail | Note |
| | | | | | plasticizer for comparison |
| 4 | 196 | 61 | 124 | 50 | SoyGold 1000 |
| 5 | 179 | 63 | 123 | 39 | SoyGold 1100 |
| 6 | 151 | 66 | 119 | 40 | SoyClear 1500 |
| 7 | 152 | 66 | 120 | 51 | CanolaGold 110 |

As Tables 2 and 3 show, when the medium strength anaerobic thread locker product Loctite 242 was reformulated using SoyGold 1000, SoyGold 1100, CanolaGold 110, or SoyClear 1500 as plasticizer, the anaerobic thread locker products performed better on oily steel surfaces, providing good curing speed and meeting the specified torque strength for the medium strength thread locker products. The Reference (unreformulated) Loctite 242 did not perform well on both surfaces as expected, thus demonstrating that the plasticizer SoyGold 1000, SoyGold 1100, CanolaGold 110 or SoyClear 1500 when formulated into medium strength thread locker products can provide good curing speed on oily steel surfaces. The break strength of the cured composition after 24 hours on oily nut/bolt assembly ranged from about 80 to about 180 inch-pounds. The prevail strength of the cured composition after 24 hours on an oily nut/bolt assembly ranged from about 25 to about 80 inch-pounds. The cured thread locker products also meet the breakaway or breakloose torque strengths specified for medium strength anaerobic adhesives.

Syntheses of Curable
(Meth)Acrylate-Functionalized Bio-Renewable
Oleaginous Polyurethane Polymers Example 3

Preparation of a Curable
(Meth)acrylate-Functionalized Polyurethane Using
the Extended Method Methacrylated Agrol 2.0/IPDI (1.0:1.72) Polyurethane Resin To a 2-L jacketed polymerization reactor equipped with a thermocouple, stirrer, condenser, and nitrogen inlet/oulet was added Agrol 2.0 (374.61 g, 0.1766 moles), dibutyltin dilaurate (0.24 g, 0.0004 moles), 3-(3,5-ditert-butyl-4-hydroxyphenyl)propanoic acid, [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl]ester (0.096 g, 0.00008 moles), 4-methoxyphenol (0.096 g, 0.0008 moles), and phosphoric acid (0.013 g, 0.00014 moles). The contents were heated to a temperature of 60° C. and allowed to mix for 15 minutes.

Isophorone diisocyanate (IPDI) (71.49 g, 0.321 moles) was added and allowed to react for about +2 hours. A titration was then performed to determine the residual isocyanate content. Hydroxyethylmethacrylate (36.92 g, 0.284 moles) was then added and allowed to react for a period of time of 3 hours at a temperature of 60° C. This reaction resulted in the formation of a clear and yellow and viscous methacrylated polyurethane resin (451.6 g, 93.4% yield).

Example 4

Preparation of a Curable
(Meth)acrylate-Functionalized Polyurethane Using
the Extended Method Methacrylated Agrol 2.0/IPDI (1.0:2.0) Polyurethane Resin To a 2-L jacketed polymerization reactor equipped with a thermocouple, stirrer, condenser, and nitrogen inlet/oulet was added Agrol 2.0 (228.78 g, 0.1407 moles), dibutyltin dilaurate (0.17 g, 0.0003 moles), 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl]ester (0.096 g, 0.00008 moles), 4-methoxyphenol (0.069 g, 0.0006 moles), and phosphoric acid (0.009 g, 0.00009 moles). The contents were heated to a temperature of 60° C. and allowed to mix for 15 minutes.

Isophorone diisocyante (IPDI) (65.51 g, 0.295 moles) was added and allowed to react for a period of time of about 2 or more hours. A titration was then performed to determine the residual isocyanate content. Hydroxyethylmethacrylate (44.65 g, 0.343 moles) was then added and allowed to mix for 3 hours at a temperature of 60° C. This reaction resulted in the formation of a clear and yellow, viscous methacrylated polyurethane resin (329.4 g, 94.1% yield).

Example 5

Preparation of a Curable
(Meth)acrylate-Functionalized Polyurethane Using
the Extended Method Methacrylated Agrol 3.6/IPDI (1.0:2.0) Polyurethane Resin To a 2-L jacketed polymerization reactor equipped with a thermocouple, stirrer, condenser, and nitrogen inlet/oulet was added Agrol 3.6 (582.61 g, 0.3739 moles), dibutyltin dilaurate (0.49 g, 0.0008 moles), and phosphoric acid (0.025 g, 0.0003 moles). The contents were heated to a temperature of 60° C. and allowed to mix for 15 minutes. Isophorone diisocyante (IPDI) (256.52 g, 1.154 moles) was added and allowed to react for a period of time of about over 2 hours. A titration was then performed to determine the residual isocyanate content. Hydroxyethylmethacrylate (168.68 g, 1.296 moles) was then added and allowed to mix for 3 hours at a temperature of 60° C. This reaction resulted in the formation of a clear and yellow, viscous methacrylated polyurethane resin (931.7 g, 92.4% yield).

Example 6

Preparation of a Curable
(Meth)acrylate-Functionalized Polyurethane Using
the Extended Method Methacrylated Agrol 3.6/IPDI (1.0:2.0) Polyurethane Resin with IPDI and HEMA Hard Block Moieties Prepared In Situ To a 2-L jacketed polymerization reactor equipped with a thermocouple, stirrer, condenser, and nitrogen inlet/oulet was added isophorone diisocyanate (68.00 g, 0.310 moles), hydroxyethylmethacrylate (19.81 g, 0.152 moles), dibutyltin dilaurate (0.21 g, 0.0003 moles), 3-(3,5-ditert-butyl-4-hydroxyphenyl)propanoic acid, [3-[3-(3,5-ditert-butyl-4-hydroxyphenyl)-1-oxopropoxy]-2,2-bis[[3-(3,5-ditert-butyl-4- hydroxyphenyl)-1-oxopropoxy]methyl]propyl] ester (0.021 g, 0.00002 moles), 4-methoxyphenol (0.021 g, 0.0002 moles), and phosphoric acid (0.009 g, 0.00009 moles). The contents were heated to a temperature of 65° C. and allowed to react for a period of time of about over 1 hour.

Agrol 3.6 (79.45 g, 0.0495 moles) was then added and allowed to mix for a period of time of about over 2 hours. A titration was then performed to determine the residual isocyanate content. Hydroxyethylmethacrylate (40.98 g, 0.284 moles) was then added and allowed to mix for 3 hours at a temperature of 60° C. This reaction resulted in the formation of a clear and yellow, viscous methacrylated polyurethane resin (193.4 g, 93.8% yield).

Example 7

Preparation of a Curable (Meth)acrylate-Functionalized Polyurethane Using the Direct Method Methacrylated Agrol 4.0/IPDI (1.0:2.0) Polyurethane Resin with IPDI and HEMA Hard Block Moieties Prepared In Situ To a 2-L jacketed polymerization reactor equipped with a thermocouple, stirrer, condenser, and nitrogen inlet/oulet was added IPDI (250.00 g, 1.125 moles), hydroxyethylmethacrylate (58.27 g, 0.448 moles), dibutyltin dilaurate (1.47 g, 0.0023 moles), 3-(3,5-ditert-butyl-4-hydroxyphenyl)propanoic acid, [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.084 g, 0.0001 moles), 4-methoxyphenol (0.021 g, 0.0002 moles), and phosphoric acid (0.08 g, 0.0008 moles). The contents were heated to a temperature of 65° C. and allowed to react for a period of time of about over 1 hour.

Agrol 4.0 (275.93 g, 0.1831 moles) was then added and allowed to mix for a period of time of about over 2 hours. A titration was then performed to determine the residual isocyanate content. Hydroxyethylmethacrylate (176.3 g, 1.223 moles) was then added and allowed to mix for 3 hours at a temperature of 60° C. This reaction resulted in the formation of a clear and yellow, viscous methacrylated polyurethane resin (794.3 g, 94.2% yield).

Example 8

Preparation of a Curable (Meth)Acrylate-Functionalized Polyurethane Using the Direct Method Methacrylated Pomoflex 6156/IPDI (1.0:2.0) Polyurethane Resin with IPDI and HEMA Hard Block Moieties Prepared In Situ To a 2-L jacketed polymerization reactor equipped with a thermocouple, stirrer, condenser, and nitrogen inlet/oulet was added IPDI (222.3 g, 1.00 moles), HEMA (51.96 g, 0.399 moles), dibutyltin dilaurate (2.01 g, 0.0031 moles), 3-(3,5-ditert-butyl-4-hydroxyphenyl)propanoic acid, [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.123 g, 0.0001 moles), 4-methoxyphenol (0.123 g, 0.0001 moles), and phosphoric acid (0.08 g, 0.0008 moles). The contents were heated to a temperature of 65° C. and allowed to react for a period of time of about over 1 hour.

Pomoflex 6156 (567.64 g, 0.2833 moles) was then added and allowed to mix for a period of time of about over 2 hours. A titration was then performed to determine the residual isocyanate content.

Example 9

Preparation of a Curable (Meth)Acrylate-Functionalized Polyurethane Using the Extended Method Methacrylated Pomoflex 6156/IPDI (1.0:2.0) Polyurethane Resin with IPDI and HEMA Hard Block Moieties Prepared In Situ To a 2-L jacketed polymerization reactor equipped with a thermocouple, stirrer, condenser, and nitrogen inlet/oulet was added Pomoflex 6156 (150.00 g, 0.0749 moles), dibutyltin dilaurate (0.41 g, 0.0007 moles), 3-(3,5-ditert-butyl-4-hydroxyphenyl)propanoic acid, [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.026 g, 0.00002 moles), 4-methoxyphenol (0.026 g, 0.0002 moles), and phosphoric acid (0.006 g, 0.00006 moles). The contents were heated to a temperature of 65° C. and allowed to react for a period of time of 15 minutes. Isophorone diisocyante (35.14 g, 0.1581 moles) was added and allowed to react for a period of time of about over 2 hours. A titration is then performed to determine the residual isocyanate content.

HEMA (18.10 g, 0.139 moles) was then added and allowed to mix for 3 hours at a temperature of 60° C. This reaction resulted in the formation of a clear and yellow, viscous methacrylated polyurethane resin (192.9 g, 94.7% yield).

Example 10

Preparation of a Curable (Meth)Acrylate-Functionalized Polyurethane Using the Direct Method Methacrylated Agrol 2.0/IPDI (1.0:2.0) Polyurethane Resin with IPDI and HEMA Hard Block Moieties Prepared In Situ To a 2-L jacketed polymerization reactor equipped with a thermocouple, stirrer, condenser, and nitrogen inlet/oulet was added Argol 2.0 (101.50 g, 0.0734 moles), dibutyltin dilaurate (0.08 g, 0.0001 moles), 3-(3,5-ditert-butyl-4-hydroxyphenyl)propanoic acid, [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.020 g, 0.00002 moles), 4-methoxyphenol (0.020 g, 0.0002 moles), and phosphoric acid (0.008 g, 0.00008 moles). The contents were heated to a temperature of 60° C. and allowed to mix for 15 minutes. 2-Ethylcyanomethacrylate (40.49 g, 0.0261 moles) was then added and allowed to react for a period of time of about over 4 hours. The product was recovered in an amount of 156.6 g (99.2% yield).

Example 11

Preparation of a Curable (Meth)Acrylate-Functionalized Polyurethane Using the Extended Method Methacrylated Pomoflex 61212/IPDI (1.0:2.0) Polyurethane Resin To a 2-L jacketed polymerization reactor equipped with a thermocouple, stirrer, condenser, and nitrogen inlet/oulet was added Pomoflex 61212 (345.48 g, 0.6528 moles), dibutyltin dilaurate (1.63 g, 0.003 moles), 3-(3,5-ditert-butyl-4-hydroxyphenyl)propanoic acid, [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester (0.102 g, 0.00009 moles), 4-methoxyphenol (0.102 g, 0.0008 moles), and phosphoric acid (0.019 g, 0.0002 moles). The contents were heated to a temperature of 60° C. and allowed to mix for 15 minutes. Isophorone diisocyante (296.01 g, 1.332 moles) was added and allowed to react for a period of time of about over 2 hours. A titration was then performed to determine the residual isocyanate content. HEMA (110.87 g, 0.852 moles) was then added and allowed to mix for 3 hours at a temperature of 60° C. This reaction resulted in the formation of a clear and yellow, viscous methacrylated polyurethane resin (788.9 g, 93.4% yield).

Example 12

Here, (meth)acrylate-functionalized bio-renewable oleaginous polyurethane polymers were used to formulate anaerobic adhesive compositions in a similar way as the oleaginous plasticizer was used above.

For instance, reference to Table 4 shows the model formulation used in this example.

TABLE 4

| Component | Amt/Wt % |
|---|---|
| Monofunctional (Meth)acrylate and/or (Meth)acrylate/IPDI Resin | 15 |
| Functionalized PU Resin | 73 |
| Acrylic Acid | 6 |
| NQ | 1 |
| EDTA | 1 |
| Saccharin | 1 |
| 1-Acetyl-2-phenylhydrazine | 1 |
| Cumene hydroperoxide | 2 |

The functionalized PU resin referred to in Table 4 are (meth)acrylate-functionalized polyurethane polymers made from the direct method or extended method described herein, and for which specific examples are set forth above. In Table 5 below, samples prepared with these materials are illustrated.

TABLE 5

| | Sample No./Amt (wt %) | | | | | |
|---|---|---|---|---|---|---|
| Constituent | 1 | 2 | 3 | 4 | 5 | 6 |
| HPMA | 14.5 | 0 | 14.5 | 0 | 14.5 | 0 |
| HEMA/IPDI[1] | 0 | 14.5 | 0 | 14.5 | 0 | 14.5 |
| Functionalized PU Resins | 73.84 | 73.84 | 73.84 | 73.84 | 36.92 | 36.92 |
| | | | | | 36.92 | 36.92 |
| AA | 6.06 | 6.06 | 6.06 | 6.06 | 6.06 | 6.06 |
| NQ | 0.8 | 0.8 | 0.8 | 0.8 | 0.8 | 0.8 |
| EDTA | 0.96 | 0.96 | 0.96 | 0.96 | 0.96 | 0.96 |
| Saccharin | 0.96 | 0.96 | 0.96 | 0.96 | 0.96 | 0.96 |
| APH | 0.96 | 0.96 | 0.96 | 0.96 | 0.96 | 0.96 |
| CHP | 1.92 | 1.92 | 1.92 | 1.92 | 1.92 | 1.92 |

[1]HEMA:IPDI (2:1) resin

Sample Nos. 1 and 2 were made with (meth)acrylated Agrol 4.0 polyurethane polymer; Sample Nos. 3 and 4 were made with (meth)acrylated Pomoflex 6156 polyurethane polymer; and Sample Nos. 5 and 6 were made with equal amounts by weight of (meth)acrylated Pomoflex 6156 polyurethane polymer and (meth)acrylated Agrol 4.0 polyurethane polymer. All other components were the same and used in the same amounts, and as in the model formulation set forth in Table 4.

Figure 2:
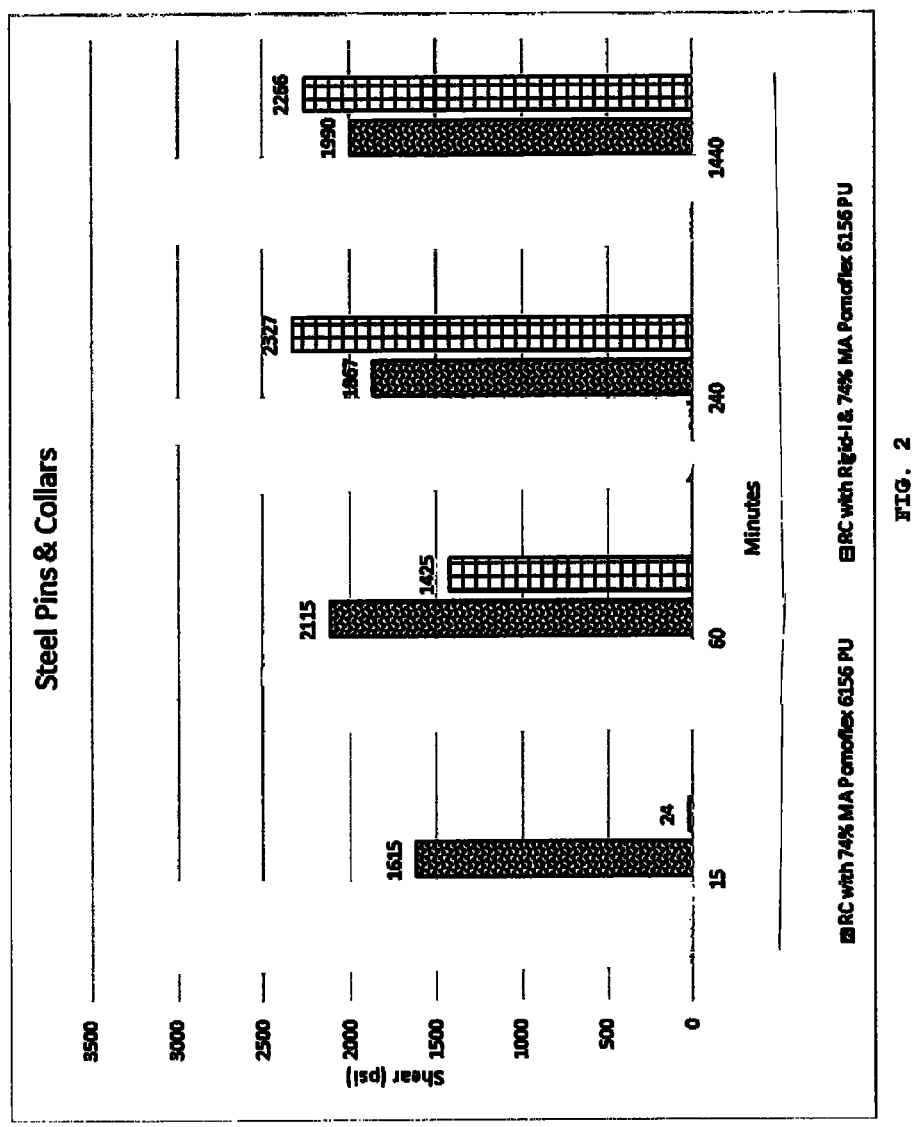
FIG. 2 depicts a plot of shear strength measured in psi over time measured in minutes for anaerobically curable compositions some of which having (meth)acrylate-functionalized Pomoflex-branded bio-renewable component.
Figure 3:
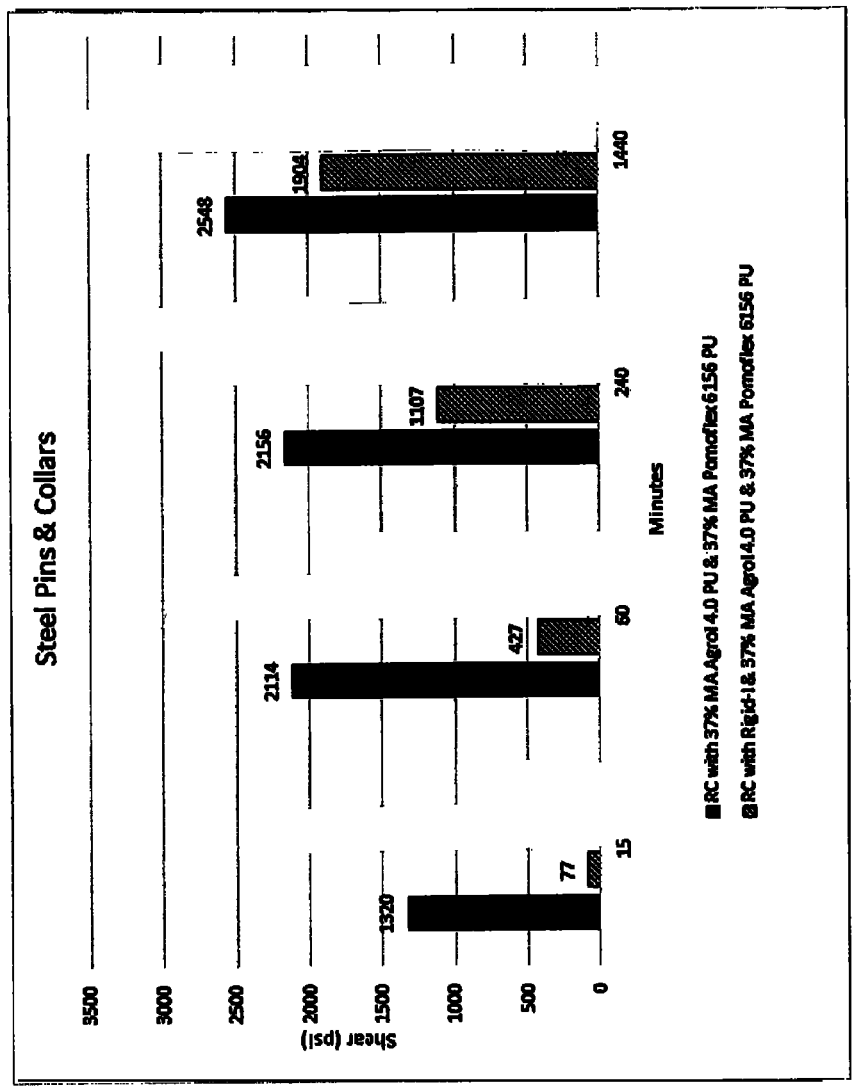
FIG. 3 depicts a plot of shear strength measured in psi over time measured in minutes for anaerobically curable compositions some of which having a combination of both (meth)acrylate-functionalized Agrol-branded bio-renewable component and (meth)acrylate-functionalized Pomoflex-branded bio-renewable component.

In Table 6 below, torque performance in terms of psi is shown on steel pins and collars. See also FIGS. 1-3.

TABLE 6

| | Torque (time/hrs) | | | |
|---|---|---|---|---|
| Sample No. | 0.25 | 1 | 4 | 24 |
| 1 | 2033 | 2126 | 2644 | 3020 |
| 2 | 1276 | 2437 | 2392 | 3005 |
| 3 | 1615 | 2115 | 1867 | 1990 |
| 4 | 24 | 1425 | 2327 | 2266 |
| 5 | 1320 | 2114 | 2156 | 2548 |
| 6 | 77 | 427 | 1107 | 1904 |

What is claimed is:

1. An anaerobically curable composition comprising:
   at least one (meth)acrylate component;
   an anaerobic cure system; and
   a (meth)acrylate-functionalized bio-renewable oleaginous polyurethane polymer.

2. The composition of claim 1, wherein the (meth)acrylate-functionalized bio-renewable oleaginous polyurethane polymer comprises a (meth)acrylate-functionalized soybean oil component.

3. The composition of claim 1, wherein the (meth)acrylate-functionalized bio-renewable oleaginous is made from an alkyl ester of soybean oil.

4. The composition of claim 1, wherein the (meth)acrylate component is represented by $H_2C=C(G)CO_2R^1$, wherein G is a member selected from the group consisting of H, halogen and alkyl having from 1 to about four carbon atoms, and $R^1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

5. The composition according to claim 1, wherein the (meth)acrylate component is a member selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

6. The composition of claim 1, wherein the (meth)acrylate-functionalized bio-renewable oleaginous polyurethane polymer is present in amounts of about 1.0 percent to about 60.0 percent by weight of the total composition.

7. The composition of claim 1, wherein the (meth)acrylate component is present in amounts of about 50 percent to about 90 percent by weight of the total composition.

8. The composition of claim 1, further comprising a material selected from the group consisting of thickeners, coloring agents, chelators, diluents and combinations thereof.

9. An anaerobic composition comprising:
(a) a (meth)acrylate component in the amount of about 50 percent to about 90 percent by weight of the total composition;
(b) an anaerobic cure system; and
(c) a (meth)acrylate-functionalized bio-renewable oleaginous polyurethane polymer in an amount of about 1.0 percent to about 60.0 percent by weight of the total composition.

10. The composition of claim 9, wherein the anaerobic cure system comprises a cure initiator in the amount of 0.1 percent to about 5 percent by weight of the total composition and a cure accelerator in the amount of about 0.1 percent to about 5 percent by weight of the total composition.

11. The composition of claim 9, wherein the (meth)acrylate-functionalized bio-renewable oleaginous polyurethane polymer is a (meth)acrylate-functionalized soybean oil.

12. The composition of claim 9, wherein the (meth)acrylate-functionalized bio-renewable oleaginous polyurethane polymer
is present in the amounts of about 1 percent to about 15 percent by weight of the total composition.

13. The composition of claim 9, further comprising a material selected from the group consisting of thickeners, coloring agents, chelators, diluents and combinations thereof.

14. A method of preparing an anaerobically curable adhesive composition comprising:
(a) forming a composition comprising at least one (meth)acrylate component and an anaerobic cure system; and
(b) combining said composition with a (meth)acrylate-functionalized bio-renewable oleaginous polyurethane polymer in an amount of 1.0 percent to about 60.0 percent by weight of the total composition.

15. A method of bonding oily surfaces comprising the steps of:
providing an anaerobically curable adhesive composition comprising;
at least one (meth)acrylate component;
an anaerobic cure system; and
a (meth)acrylate-functionalized bio-renewable oleaginous polyurethane polymer;
applying said composition to an oily surface of a substrate; and
mating said substrate with another substrate; and
permitting said composition to cure.

16. The method of claim 15, wherein the oily substrate is constructed from a material selected from zinc, steel, stainless steel, cadmium and combinations thereof.

17. The method of claim 15, wherein the oily substrate is a nut or bolt.

18. A method for using an anaerobically curable composition, said method comprising the steps of:
(a) providing an anaerobically curable composition in accordance with claim 1;
(b) providing two or more substrates, each of which having at least one complimentary surface;
(c) applying said anaerobically curable composition to at least one of said complimentary surfaces of the substrates; and
(d) mating said complimentary surfaces of the substrates such that said anaerobically curable composition is disposed therebetween in an anaerobic environment so as to permit said composition to cure anaerobically.

* * * * *